United States Patent
Albertson et al.

(10) Patent No.: US 7,245,038 B2
(45) Date of Patent: Jul. 17, 2007

(54) EXTENDING FUEL ECONOMY OPERATING RANGE IN GASOLINE DIRECT INJECTION (GDI) ENGINES

(75) Inventors: William C. Albertson, Clinton Township, MI (US); Mike M. Mc Donald, Macomb, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 20 days.

(21) Appl. No.: 11/245,754

(22) Filed: Oct. 7, 2005

(65) Prior Publication Data

US 2007/0080537 A1    Apr. 12, 2007

(51) Int. Cl.
F02H 7/00    (2006.01)
(52) U.S. Cl. ............... 290/44; 290/40 B; 290/40 C; 322/11; 322/23
(58) Field of Classification Search ........... 290/44, 290/40 B, 40 C; 322/11, 23
See application file for complete search history.

(56) References Cited

U.S. PATENT DOCUMENTS

| | | | | |
|---|---|---|---|---|
| 3,918,543 A | * | 11/1975 | Halem | 180/282 |
| 5,563,802 A | * | 10/1996 | Plahn et al. | 700/297 |
| 5,614,809 A | * | 3/1997 | Kiuchi et al. | 322/11 |
| 6,420,936 B1 | * | 7/2002 | Nishiyama | 330/297 |
| 6,624,529 B2 | * | 9/2003 | Obayashi | 290/40 C |
| 6,694,948 B2 | * | 2/2004 | Glugla et al. | 123/404 |
| 6,817,336 B2 | * | 11/2004 | Glugla et al. | 123/198 F |
| 6,823,840 B1 | * | 11/2004 | Tamai et al. | 123/352 |
| 7,019,414 B2 | * | 3/2006 | Albertson et al. | 290/40 B |

OTHER PUBLICATIONS

U.S. Appl. No. 10/874,088, filed Jun. 22, 2004, Albertson.

* cited by examiner

Primary Examiner—Darren Schuberg
Assistant Examiner—Iraj A Mohandesi
(74) Attorney, Agent, or Firm—Christopher DeVries

(57) ABSTRACT

An engine control system for controlling engine operation in high-output (HO) and fuel-economy (FE) modes in a gasoline direct injection (GDI) engine includes an alternator that is driven by the engine and that is regulated by a load control signal. An alternator load control module generates the load control signal based on an engine torque to regulate a load of the alternator on the engine to maintain the engine torque below a threshold level and maintain engine operation in the FE mode.

16 Claims, 7 Drawing Sheets

EXTENDING FUEL ECONOMY OPERATING RANGE IN GASOLINE DIRECT INJECTION (GDI) ENGINES

FIELD OF THE INVENTION

The present invention relates to internal combustion engines, and more particularly to extending a fuel economy mode of a dual mode gasoline direct injection (GDI) engine.

BACKGROUND OF THE INVENTION

Internal combustion (IC) engines generate drive torque by combusting a fuel and air mixture. The drive torque not only provides propulsion force to the wheels but also drives auxiliary engine loads. For example, the drive torque is used to drive loads including, but not limited to, an A/C compressor, a generator or alternator, a coolant pump, an oil pump and the like.

Some internal combustion engines include direct injection control systems that regulate the injection timing of fuel into the cylinders. More specifically, the control system switches engine operation between a high output (HO) mode and a fuel economy (FE) mode based on engine load. In the HO mode, fuel is injected during the intake stroke of the piston to produce a homogeneous combustion charge. The homogeneous charge enables maximum combustion of the oxygen within the cylinder as a result of the fuel distribution throughout the combustion charge.

In the FE mode, fuel is injected during the compression stroke of the piston to form a compact fuel cloud near the spark plug at the time of ignition, providing a stratified combustion charge. Within the stratified combustion charge, a substantial amount of air is not combusted in the combustion process, but is heated and expands to produce power. An improvement in fuel economy is achieved by the reduction of intake stroke pumping work that results from higher intake manifold pressures. Therefore, it is advantageous to stay operating in the FE mode.

During typical engine operation in the FE mode, there are many operating points requiring low engine torque output. At low engine torque output, the engine pumping losses are higher than at higher engine torque output. That is to say, the engine is still not operating as efficiently as desired when operating in the FE mode. Additionally, there are many operating points at or near the transition threshold, which defines the transition point between the HO and the FE modes. Once in the HO mode, hysteresis often delays transition back into the FE mode. Both of these conditions result in missed opportunities to reduce fuel consumption.

SUMMARY OF THE INVENTION

Accordingly, the present invention provides an engine control system for controlling engine operation in a fuel-economy (FE) mode of a gasoline direct injection (GDI) engine. The engine control system includes an alternator that is driven by the engine and is regulated by a load control signal. An alternator load control module generates the load control signal based on an engine torque to regulate a load of the alternator on the engine to maintain the engine torque below a threshold level and maintain engine operation in the FE mode.

In other features, the engine control system further includes an energy storage device that is charged by the alternator. The load control signal is further based on a state of charge (SOC) of the energy storage device.

In another feature, the alternator load is inversely proportional to the engine torque.

In still another feature, the alternator load increases as the engine torque decreases to maintain the engine torque within the efficient operation range.

In yet another feature, the load decreases as the engine torque increases to maintain the engine torque below the threshold level.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
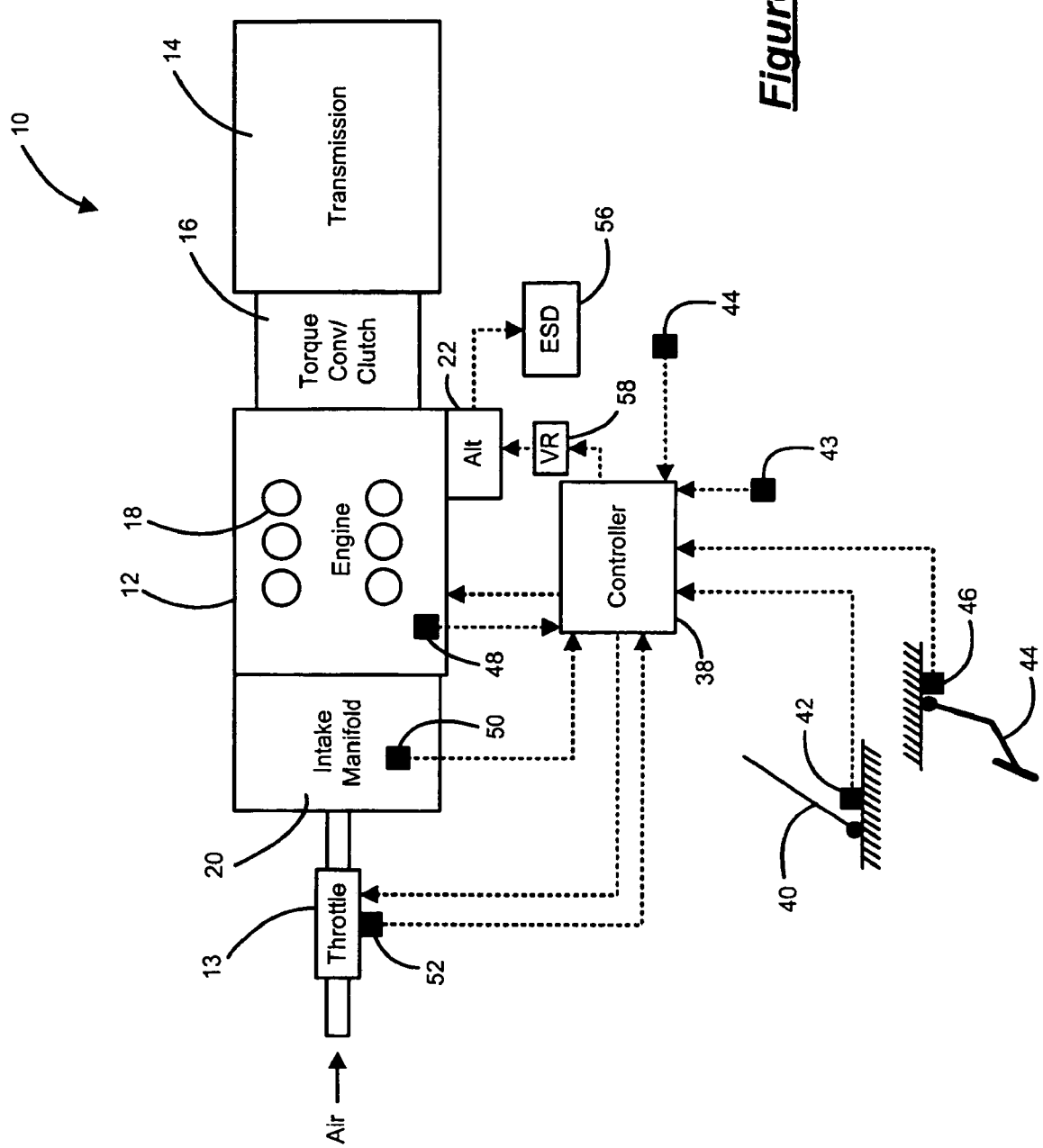
FIG. 1 is a functional block diagram illustrating a vehicle powertrain including a gasoline direct injection (GDI) engine control system according to the present invention.

The following description of the preferred embodiment is merely exemplary in nature and is in no way intended to limit the invention, its application, or uses. For purposes of clarity, the same reference numbers will be used in the drawings to identify similar elements. As used herein, high output (HO) mode refers to engine operation using fuel injection during the intake stroke of the piston. Fuel economy (FE) mode refers to operation using fuel injection during compression stroke of the piston. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the terms engine torque or engine load refer to the amount of torque output desired from the engine to drive the multiple loads (e.g., alternator, pumps, propulsion power to drivetrain) on the engine.

Figure 2:
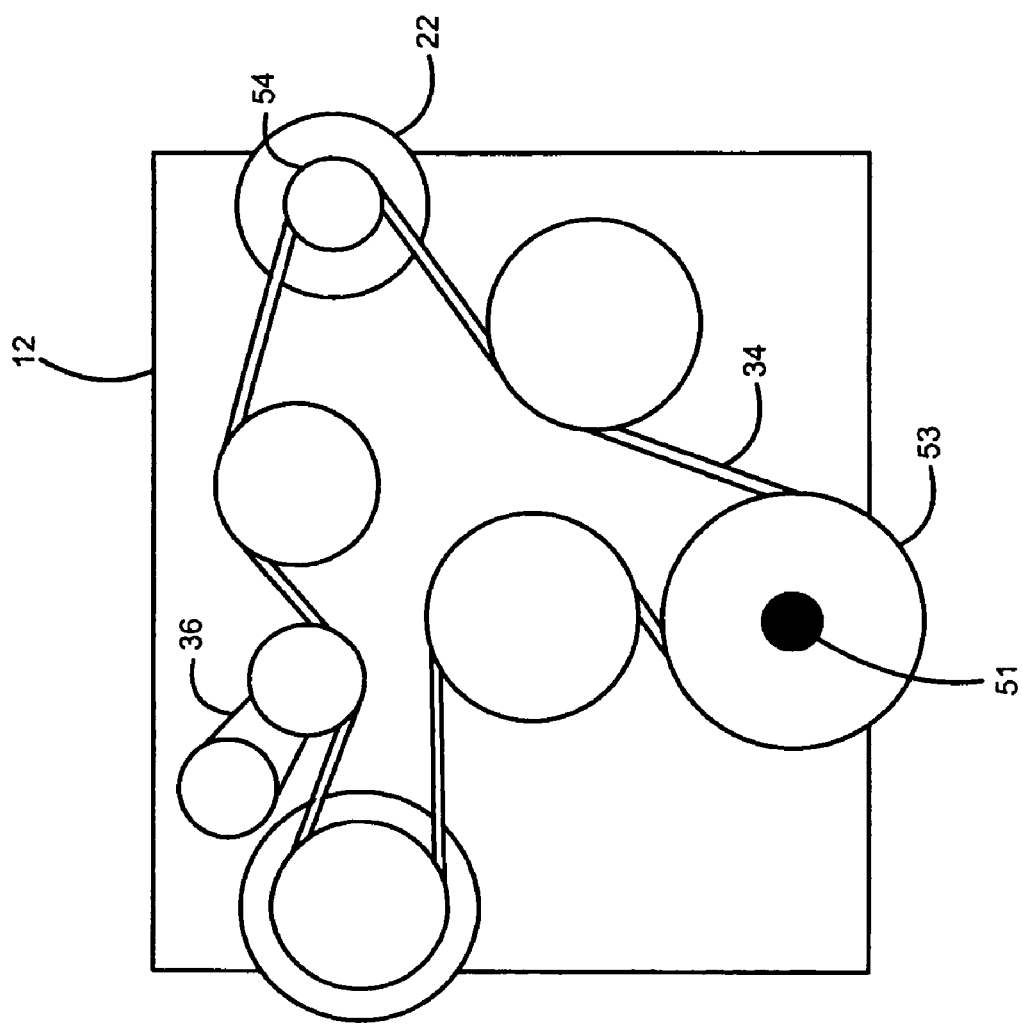
FIG. 2 is a schematic front view of the engine of FIG. 1.

Referring now to FIGS. 1 and 2, a vehicle 10 includes an engine 12 that drives a transmission 14. The transmission 14 is either an automatic or a manual transmission that is driven by the engine 12 through a corresponding torque converter or clutch 16. Air flows into the engine 12 through a throttle 13. The engine 12 includes N cylinders 18. Although FIG. 1 depicts six cylinders (N=6), it is appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18. The engine 12 also drives accessory loads including an alternator 22 via a belt drive 34, which includes a tensioner 36.

A control module 38 communicates with the engine 12 and various inputs and sensors as discussed herein. A vehicle operator manipulates an accelerator pedal 40 to regulate the throttle 13. More particularly, a pedal position sensor 42 generates a pedal position signal that is communicated to the control module 38. The control module 38 generates a throttle control signal based on the pedal position signal. A throttle actuator (not shown) adjusts the throttle 13 based on the throttle control signal to regulate air flow into the engine 12.

The vehicle operator manipulates a brake pedal 44 to regulate vehicle braking. More particularly, a brake position sensor 46 generates a brake pedal position signal that is communicated to the control module 38. The control module 38 generates a brake control signal based on the brake pedal position signal. A brake system (not shown) adjusts vehicle braking based on the brake control signal to regulate vehicle speed. An engine speed sensor 48 generates a signal based on engine speed. An intake manifold absolute pressure (MAP) sensor 50 generates a signal based on a pressure of the intake manifold 20. A throttle position sensor (TPS) 52 generates a signal based on throttle position.

The belt drive 34 is driven by a crankshaft 51 and a pulley 53. The belt drive 34 engages and rotates an alternator pulley 54, which drives the alternator 22. The alternator 22 generates power to recharge an energy storage device (ESD) 56. The ESD 56 can include, but is not limited to, a battery, a capacitor, a super-capacitor, or combination thereof. A voltage regulator 58 adjusts a charging duty cycle or load of the alternator 22 based on signals from the control module 38. It can be appreciated that the voltage regulator 58 can be an integrated component of the alternator 22. When a voltage of the ESD 56 is below a desired operating or reference voltage ($V_{REF}$) (e.g., 14.6V), the control module 38 signals the voltage regulator 58 to operate the alternator 22 at a specified charging duty cycle to produce charging current. When a voltage of the ESD 56 is above $V_{REF}$, the control module 38 signals the voltage regulator 58 to cease alternator operation. In this manner, the load of the alternator 22 on the engine 12 is adjustable. The control module 38 varies the charging duty cycle or alternator load according to the alternator load control system, as explained in further detail below.

The state of charge (SOC) of the ESD 56 is determined by the control module 38 based on a terminal voltage signal ($V_t$) and a terminal current signal ($I_t$). These values are directly measured by corresponding sensors (not shown). The SOC indicates the amount of usable energy stored within the ESD 56 at a given time. It is analogous to the amount of fuel in a fuel tank. In order to improve life and overall performance of the ESD 56, it is desired to maintain the ESD 56 at an optimal SOC.

When light engine torque or load occurs, the control module 38 transitions the engine 12 to the FE mode. The engine torque is determined based on the intake MAP and engine speed. More particularly, engine torque is based on manifold vacuum, which is the difference between MAP and the atmospheric pressure. If the engine torque is below a threshold level for a given RPM, it is deemed light and the engine 12 transitions from the HO mode to the FE mode. If the engine torque is above the threshold level for the given RPM, it is deemed heavy and the engine 12 transitions from the FE mode to the HO mode. The control module 38 controls the engine 12 based on the alternator load control system to maintain engine operation in the more fuel efficient regions and to extend the time during which the engine 12 operates in the FE mode.

The alternator load control system of the present invention regulates the alternator load to effect the overall engine torque. More particularly, as the alternator load is increased, the engine torque is increased. Conversely, as the alternator load is decreased, the engine torque is decreased.

During operation in the FE mode, the alternator load is controlled based on a percentage of the maximum engine torque output. For example, as engine torque increases, the alternator load decreases to maintain engine operation below the transition threshold level for as long as possible. In this manner, engine operation in the FE mode is extended, thereby increasing engine operating efficiency. More specifically, when the engine 12 is operating in the HO mode (i.e., less fuel efficient than the FE mode), the engine 12 must operate at a torque load lower than the threshold level for a threshold time before transitioning to the FE mode. Decreased alternator load during the FE mode reduces the occurrences of transitioning to the HO mode. As a result, engine operating time in the FE mode (i.e., more efficient than the HO mode) is extended and there are reduced occurrences of transitioning back to the HO mode (i.e., efficiency losses waiting for the threshold torque level before transitioning to the FE mode are reduced). In some instances, however, torque load will exceed the threshold level regardless of the reduction in alternator load and engine operation will transition to the HO mode.

As engine torque decreases, the alternator load increases to maintain efficient engine operation. More particularly, engine operation is more efficient at higher engine torques because intake stroke pumping work is reduced and thermal efficiency is increased as compared to lower engine torques. As a result, the time at which the engine 12 operates efficiently is extended.

Figure 3:
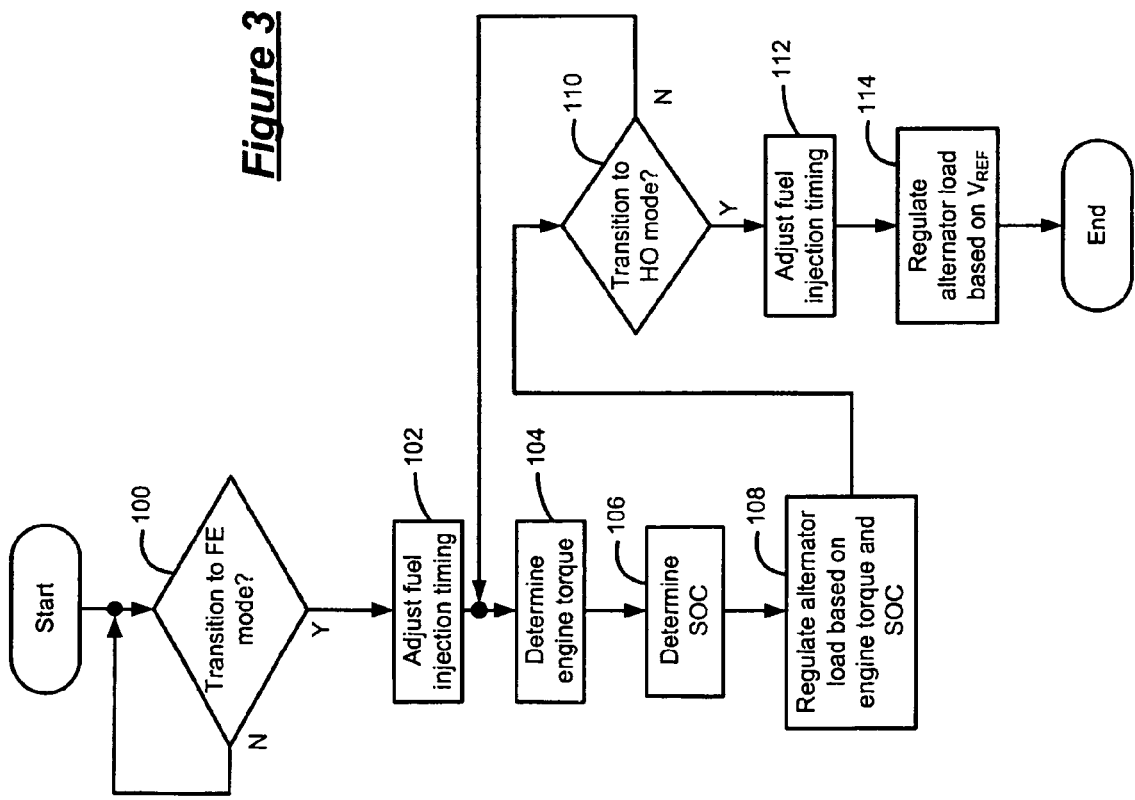
FIG. 3 is a flowchart illustrating the alternator load control according to the present invention.

Referring now to FIG. 3, the alternator load control system will be described in detail. In step 100, control determines whether to transition to the FE mode. If control determines not to transition to the FE mode, control loops back. If control determines to transition to the FE mode, control adjusts fuel injection timing to inject fuel during the compression stroke in step 102.

In step 104 control estimates engine torque. Engine torque is estimated based on engine operating conditions including, but not limited to, MAP and RPM. Control determines SOC in step 106. In step 108, control regulates the alternator load based on engine torque and SOC. More particularly, control increases the alternator load as engine torque decreases. In this manner, engine operation is maintained at a more fuel efficient operating range. Control decreases the alternator load as engine torque increases to extend engine operation time in the FE mode, as discussed in more detail above. In step 110, control determines whether to transition to the HO mode. If control determines not to transition to the HO mode, control loops back to step 104. If control determines to transition to the HO mode, control adjusts fuel injection timing to inject fuel during the intake stroke in step 112. In step 114, control regulates the alternator based on $V_{REF}$ and control ends.

Figure 4:
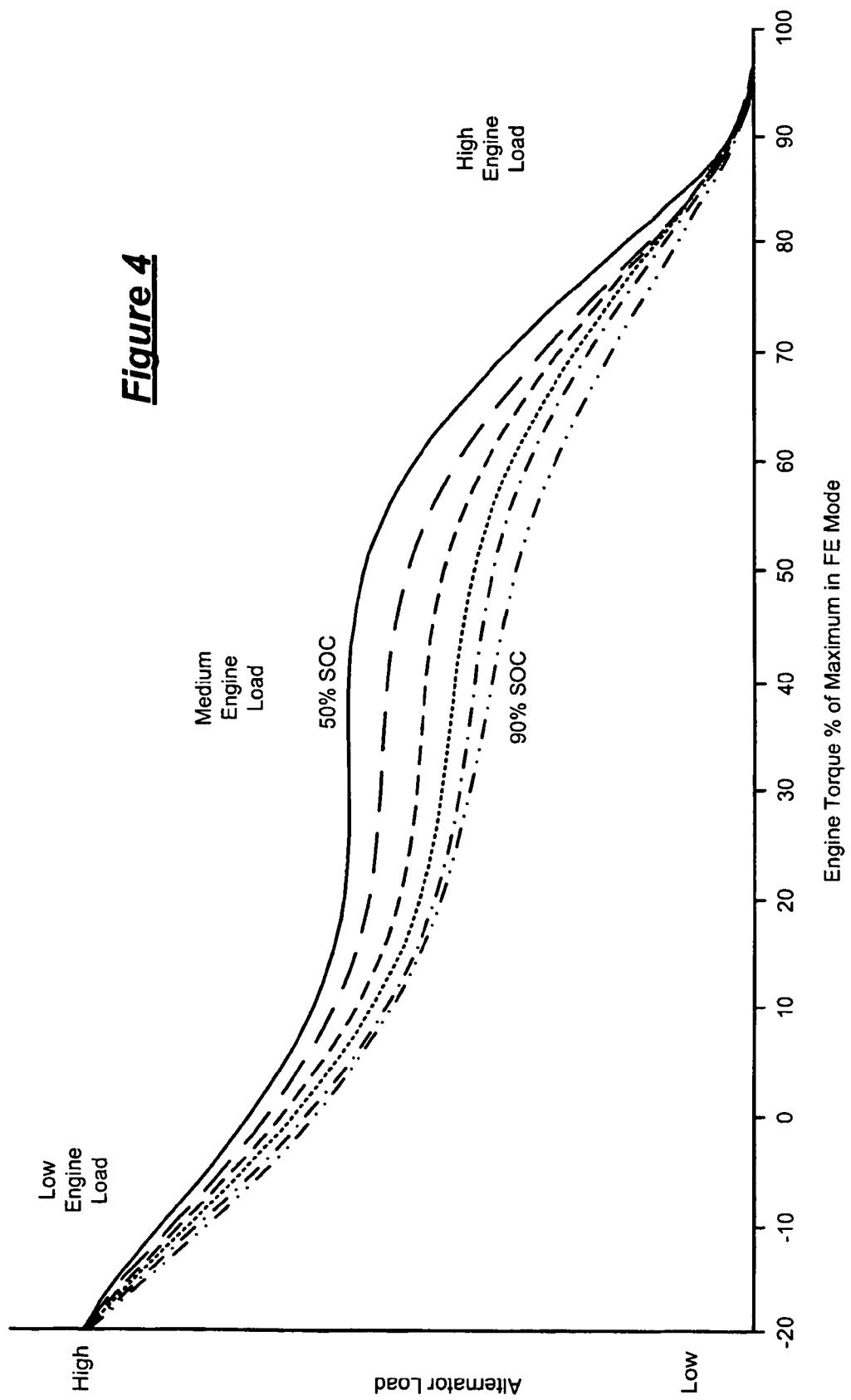
FIG. 4 is a graph illustrating alternator load curves based on battery state of charge (SOC)

Referring now to FIG. 4, exemplary alternator load curves are illustrated for the alternator load control. As discussed above, the alternator load is regulated based on engine torque and SOC. The alternator load control regulates the alternator load based on a corresponding SOC curve. Smooth transitions in alternator load occur as engine torque transitions between low and medium ranges. Similarly, smooth transitions in alternator load occur as the engine torque transitions between medium and high ranges. There is less of an alternator load transition in the medium engine load range.

Figure 5:
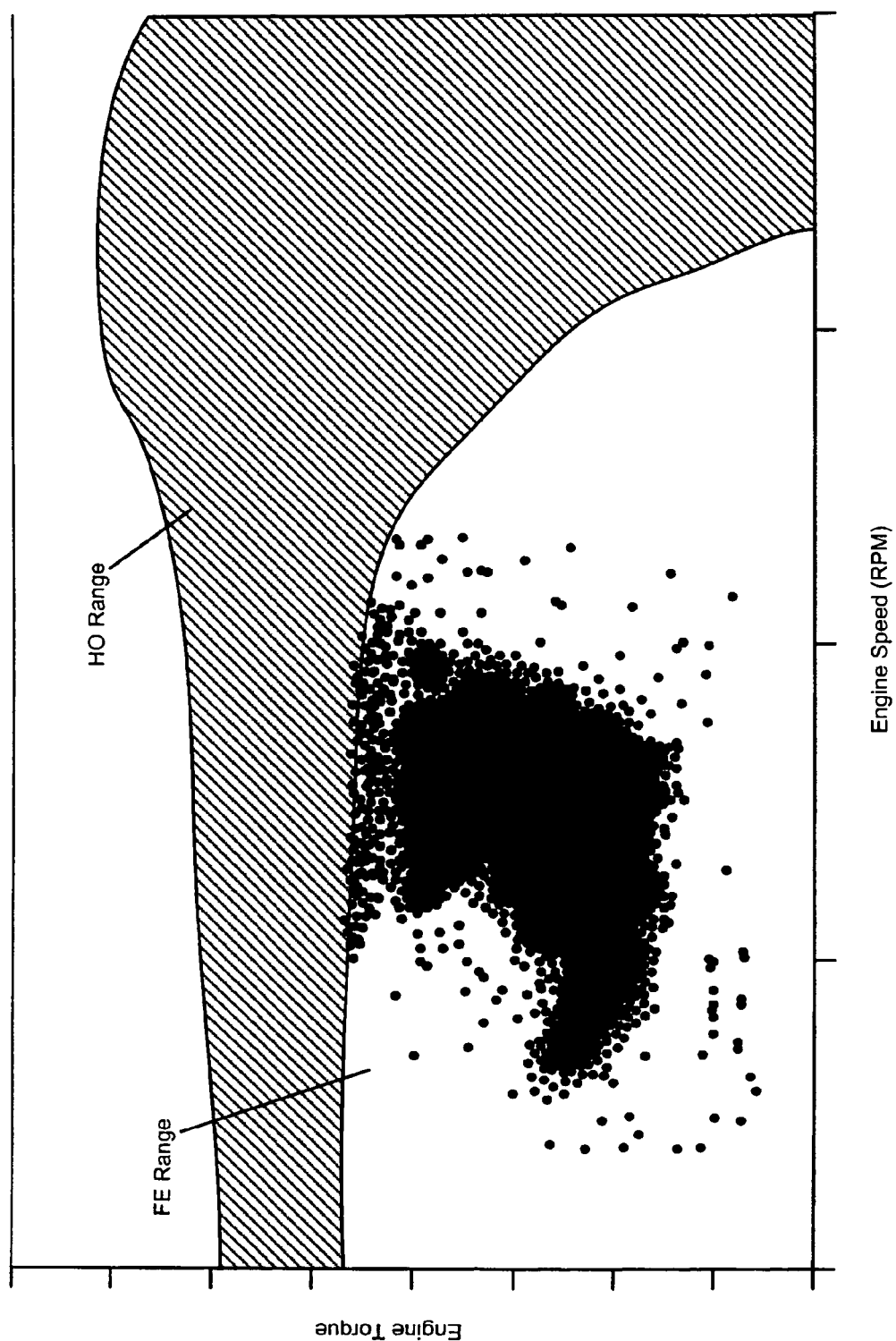
FIG. 5 is a graph illustrating exemplary engine operating points for engine operation in a fuel economy (FE) mode using traditional control strategies.
Figure 6:
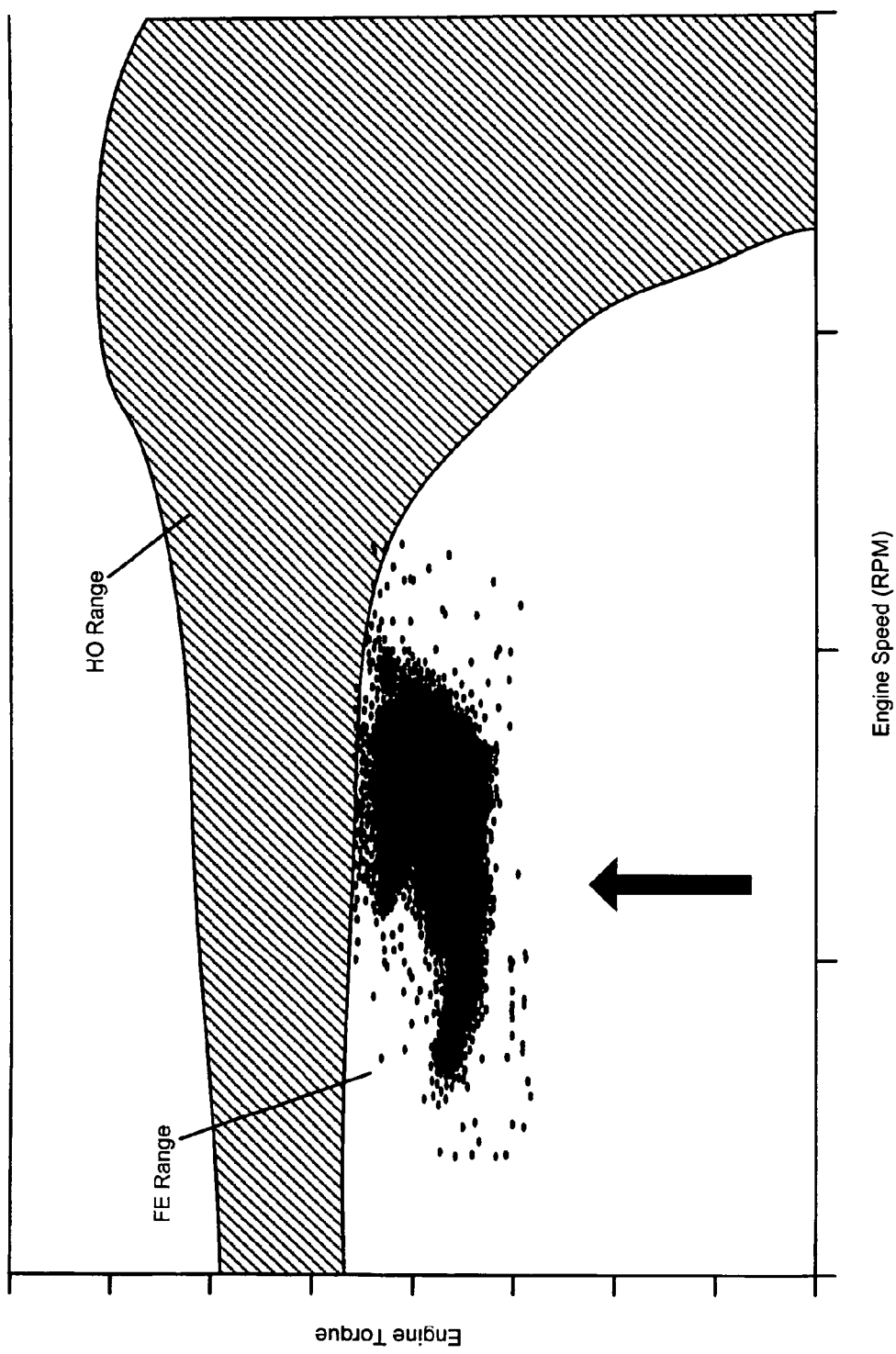
FIG. 6 is a graph illustrating exemplary engine operating points for engine operation in a fuel economy (FE) mode using the alternator load control of the present invention.

Referring now to FIGS. 5 and 6, the effect of the alternator load control on engine operation will be described in more detail. FIG. 5 is a graph illustrating exemplary engine operating points in the FE mode using traditional engine control. A significant portion of the engine operating points occur at lower engine torques where engine operation is less efficient. Additionally, several engine operating points occur right at or near the threshold level leading to a transition to the HO mode.

FIG. 6 is a graph illustrating exemplary engine operating points in the FE mode using the alternator load control of the present invention. A significant portion of the engine operating points occur at more efficient levels (i.e., higher engine torques). Additionally, the engine operating points are held sufficiently below the threshold level to reduce occurrences of transitioning to the HO mode. As a result, engine operation is more efficient and engine operation in the FE mode is extended as compared to traditional engine control.

Figure 7:
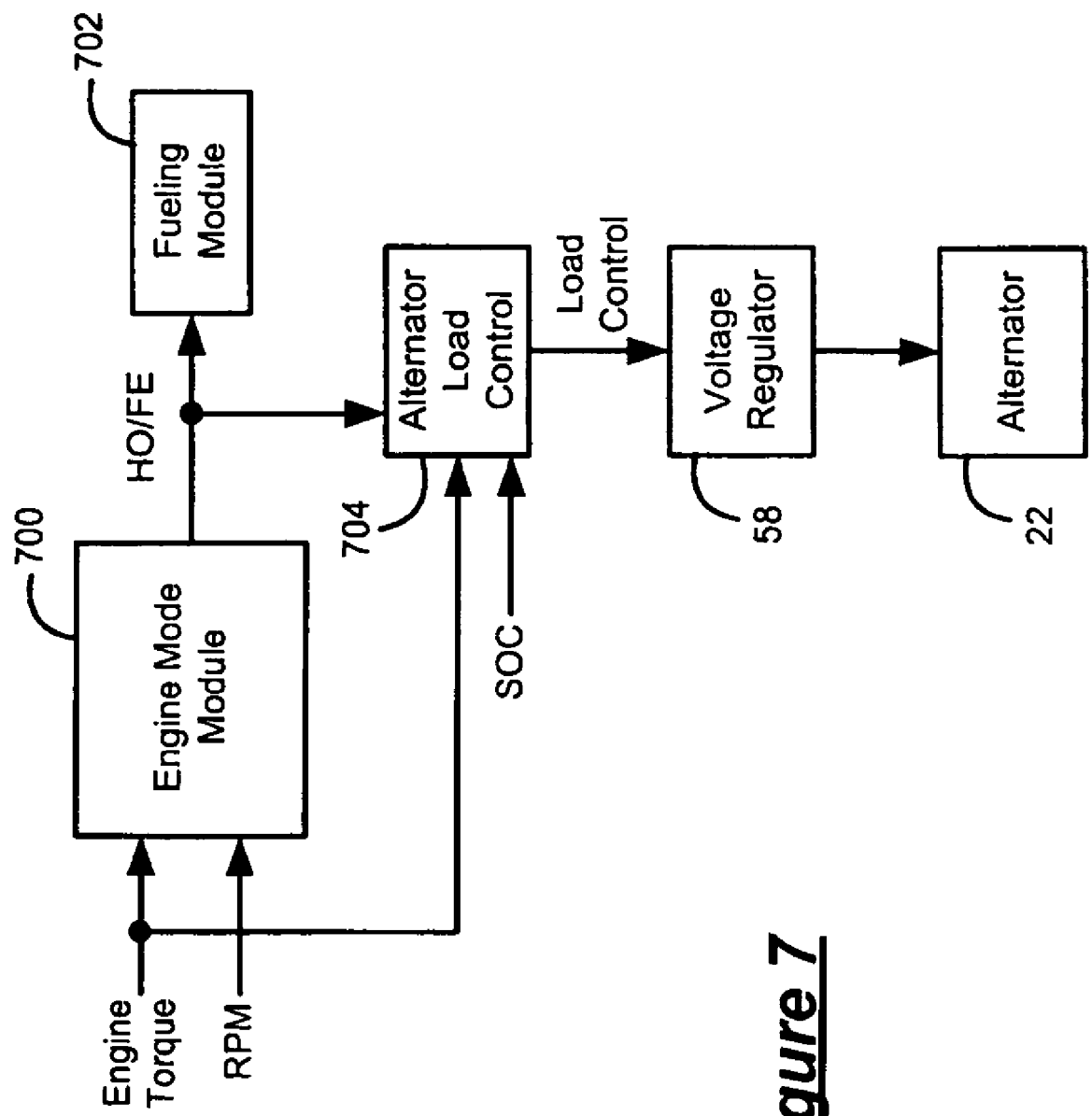
FIG. 7 is a logic diagram illustrating exemplary modules that execute the alternator load control of the present invention.

Referring now to FIG. 7, the logic flow of the alternator load control will be described in detail. An engine mode module 700 receives torque and RPM signals and generates an HO or FE signal based thereon. The HO or FE signal is sent to a fueling module 702 and an alternator load control module 704. The fueling module 702 regulates the fuel timing relative to piston stroke. The alternator load control module 704 generates load control signals based on the SOC and engine torque. The load control signal is sent to the voltage regulator 58, which manipulates operation of the alternator 22 according to the alternator load control described above.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for controlling engine operation in high-output (HO) and fuel-economy (FE) modes in a gasoline direct injection (GDI) engine, comprising:
    an engine module that transitions said engine to said FE mode when an engine torque of said engine is below a threshold level;
    an alternator that is driven by said engine and that is regulated by a load control signal; and
    an alternator load control module that generates said load control signal based on an engine torque to regulate a load of said alternator on said engine to maintain said engine torque below said threshold level and maintain engine operation in said FE mode.

2. The engine control system of claim 1 further comprising an energy storage device that is charged by said alternator.

3. The engine control system of claim 2 wherein said load control signal is further based on a state of charge (SOC) of said energy storage device.

4. The engine control system of claim 1 wherein said load is inversely proportional to said engine torque.

5. The engine control system of claim 1 wherein said load increases as said engine torque decreases to maintain said engine torque within said efficient operation range.

6. The engine control system of claim 1 wherein said load decreases as said engine torque increases to maintain said engine torque below said threshold level.

7. A method of controlling engine operation in high-output (HO) and fuel-economy (FE) modes in a gasoline direct injection (GDI) engine, comprising:
    transitioning said engine to said FE mode when an engine torque of said engine is below a threshold level;
    monitoring said engine torque of said engine; and
    regulating an alternator load on said engine based on said engine torque to maintain said engine torque below said threshold level and to maintain engine operation in said FE mode.

8. The method of claim 7 wherein said step of regulating comprises:
    increasing said alternator load as said engine torque decreases to maintain said MAP within an efficient operation range; and
    decreasing said alternator load as said engine torque increases to maintain said MAP below said threshold level.

9. The method of claim 7 further comprising charging an energy storage device based on said alternator load.

10. The method of claim 9 further comprising determining a state of charge (SOC) of said energy storage device, wherein regulating said alternator load is further based on said SOC.

11. An engine control system for controlling engine operation in high-output (HO) and fuel-economy (FE) modes in a gasoline direct injection (GDI) engine, comprising:
    an engine mode module that generates one of an HO signal and an FE signal to transition said engine between said HO and FE modes;
    an alternator load module that generates a load control signal based on an torque load of said engine when operating in said FE mode; and
    an alternator control module that regulates a load of an alternator based on said load control signal to maintain said torque load below a threshold level and to maintain engine operation in said FE mode.

12. The engine control system of claim 11 further comprising an energy storage device that is charged by said alternator.

13. The engine control system of claim 12 wherein said alternator load control signal is further based on a state of charge (SOC) of said energy storage device.

14. The engine control system of claim 11 wherein said alternator load is inversely proportional to said torque load.

15. The engine control system of claim 11 wherein said alternator load increases as said torque load decreases to maintain said torque load within said efficient operation range.

16. The engine control system of claim 11 wherein said alternator load decreases as said torque load increases to maintain said torque load below said threshold level.

* * * * *